June 26, 1956  L. B. BOYD  2,752,513
STEPPER MOTOR
Filed June 8, 1953
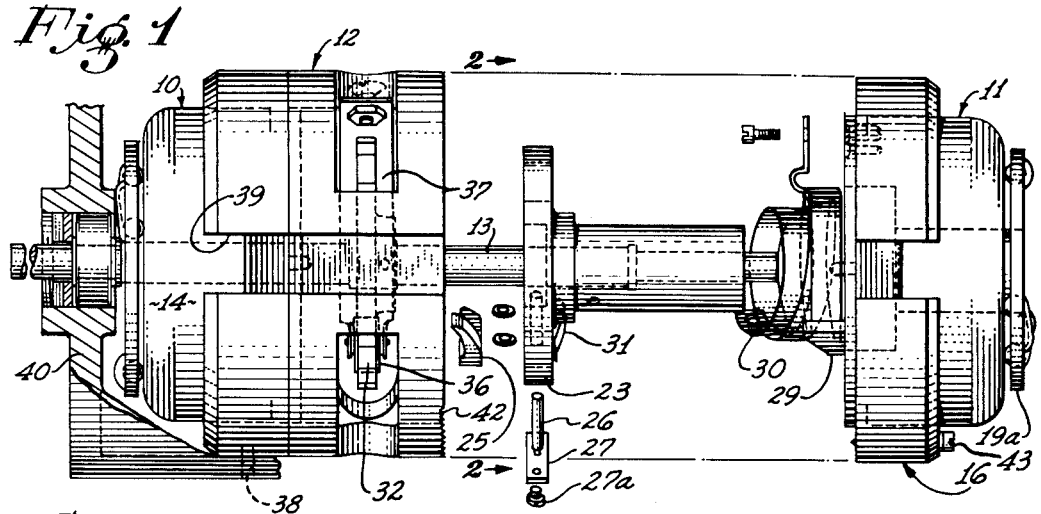
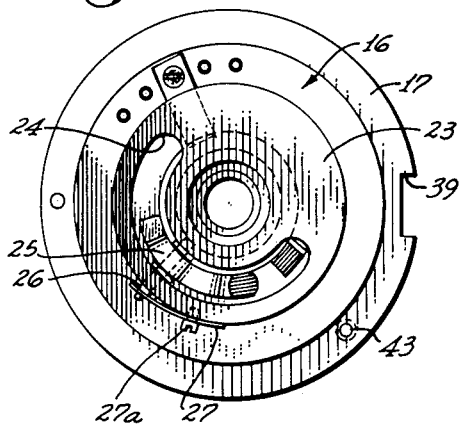
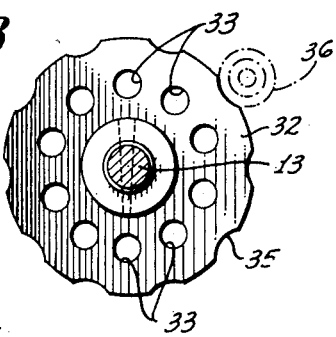
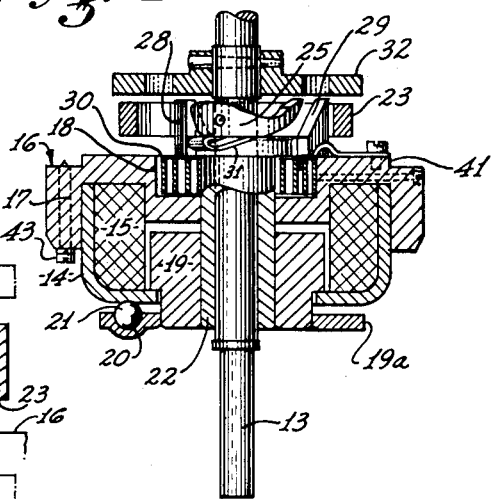
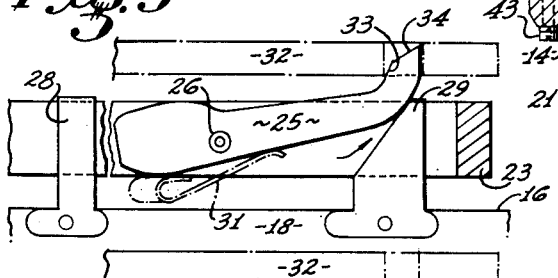
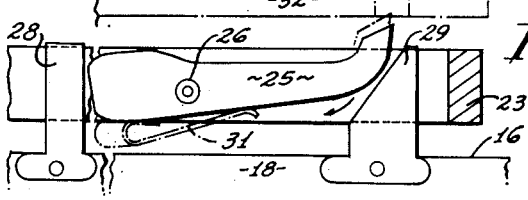
INVENTOR:
Leo B. Boyd,
By Herbert E. Metcalf
His Patent Attorney United States Patent Office 2,752,513
Patented June 26, 1956

2,752,513

STEPPER MOTOR

Leo B. Boyd, Los Angeles, Calif., assignor to Northrop Aircraft, Inc., Hawthorne, Calif., a corporation of California Application June 8, 1953, Serial No. 360,306

9 Claims. (Cl. 310—23)

The present invention relates to devices operated by electrical pulses such as are required for instance in many applications in electrical instruments.

In some such instruments it is necessary to provide a device which may be rotated very accurately through a constant angle for each pulse and preferably is adapted to be rotated in one direction or the other dependent on the manner in which the pulses are fed to the device.

In the illustrative example given hereinafter the invention is described as embodied in a small, compact, cylindrical, instrument which will be referred to as a stepper motor although it is solenoid operated in a series of steps, the particular construction of solenoid shown having been selected in view of certain inherent advantages thereof, but it is to be understood that the invention may be carried into practice by the use of other arrangements of solenoid operating means.

Stepper motors used to control accurately functioning mechanism such as for instance computing or navigational devices must be accurate in operation, responsive to signals of small magnitude, practically free from wear, small in size, and capable of perfect operation over extended periods without maintenance.

Devices of the kind to which this invention relates should also be so arranged that they may be readily incorporated in place of other previously used devices in a wide variety of equipment and should be readily adapted to the special needs of whatever type of equipment with which the device is to be used, in addition the stepper motor should of course operate on the electrical power provided for the equipment.

With the above and other considerations in view, an object of the invention is to provide a stepper motor particularly designed for use in aircraft navigational instruments.

It is a specific object of the invention to provide a pulse operated electrical instrument which can be operated over a required range of pulse frequency without danger of missing any pulses.

Another object of the invention is to provide a pulse operated electrical instrument which will operate satisfactorily over a wide range of pulse frequencies by simple adjustment of the length of movement of driving means.

A still further object of the invention is to provide a pulse motor which is practically free from friction and therefore requires very little if any lubrication.

Another object of the invention is to provide a pulse operated electrical instrument capable of use in a variety of equipment and which may be readily adjusted to requirements of direction of drive, rotation in only one direction or in either direction.

A still further object of the invention is to provide an instrument of the kind described which is subject to very little wear of the working parts and is therefore capable of extended operation at full efficiency.

With these and other objects in view the invention comprises an instrument having a shaft rotated in a step-by-step manner by solenoid means which are positioned at one or both ends of the shaft to effect rotation of the shaft in either one or in both directions, motion transmitting means including a movable member arranged between solenoid operated means and an apertured disc secured to the shaft, said movable member being engaged with the disc and released therefrom at each movement of the solenoid armature.

In the drawings:

Figure 1 is a fragmentary side elevation of the instrument incorporating the features of the invention, the right hand portion thereof not having yet been pushed into place.

Figure 2 is a face view of the right hand operating unit of the instrument looking in the direction of the arrows 2 in Figure 1.

Figure 3 is a face view of a disc showing apertures by which it can be moved in steps in one direction by the operation of the left hand operating unit and by steps in the opposite direction by the right hand operating unit.

Figure 4 is a cross sectional view showing a dog, in retracted position, forming a part of the driving connection between a solenoid and a driven disc secured to a shaft.

Figure 5 is a fragmentary diagrammatic view drawn on an enlarged scale showing the dog shown in Figure 4 engaged in a recess in the driven disc.

Figure 6 is a view similar to that of Figure 5 but showing the dog at the commencement of the return movement of the solenoid.

Referring now to Figure 1, the instrument shown by way of example is arranged to be operated by solenoid elements 10 and 11, one at each side of a center inner housing 12, solenoid element 11 being shown not yet secured in position in order to expose interior parts. Such a construction enables the shaft 13 of the instrument to be rotated in either direction but it will be understood, as later explained, that both solenoid elements can be arranged to drive the shaft 13 in the same direction, and if the shaft is to be rotated in only one direction only one solenoid element might be required.

Each solenoid element comprises a case 14 (Figure 4) having a solenoid coil 15 enclosed therein, the case being covered on its inner side by a plate 16 machined to provide a mounting ring 17 and a central recess 18.

The solenoid armature 19 is tubular and extends outwardly of the case, and an armature plate 19a is rigidly secured, as by peening, to the armature 19 extension.

The armature will of course be pulled axially into the coil when the latter is energized by a pulse whereas it is necessary to produce a turning movement of the shaft 13. While the desired conversion of motion may be effected in obviously various ways, I prefer, for simplicity, to utilize a known construction in which inclined grooves 20 are stamped in the armature plate 19a, forming inclined races for a ball bearing 21 placed in each of the three grooves, the arrangement being such that an angular movement of about 45° of the armature results as it is moved inwardly of the coil, the axial movement being thereby reduced to a negligible amount.

A sleeve 22 is secured to the armature 19, as for instance making it a press fit in the armature, and its inner end is provided with a disc or carrier plate 23, the carrier plate 23 is therefore rotated about 45° at each pulse and moved axially a very small distance of the order of a few thousandths of an inch at each pulse.

The carrier plate 23 is provided with means to transmit its rotational movement to a disc 32, later described, mounted rigidly on shaft 13. The motion transmitting means are mounted in an arcuate slot 24 (Figure 2) in the carrier plate 23 and comprise a dog 25 pivoted on a pin 26 inserted in a hole drilled through the walls of the slot and preferably held therein by a short length of straight spring 27 secured to the edge of the stop plate as by a small screw 27a.

A back cam stop 28 and a front cam stop 29 project from the surface of plate 16 into slot 24 and between the dog 25 and the ends of the slot.

Preferably the cam stops are detachably secured in the plate 16 by base portions secured in recesses machined in the inner edge of the recess 18 in the plate, the bases being secured in the recesses in any suitable manner.

A flat clock-type return spring 30 is positioned under tension in the recess 18 with one end secured to the plate 16 and the other end secured to sleeve 22, the action of the spring keeping the rear end of the dog resiliently pressed against stop 28 while the solenoid is deenergized.

A reverse bent flat spring strip 31 secured at one end to the rim of the stop plate 23 bears under tension against the under side of the dog 25 forwardly of its pivotal point and, immediately the rear end of the dog is moved away from the back cam stop, will raise the front end of the dog above the level of the stop plate to an extent sufficient to enter into driving engagement with the disc secured on shaft 13.

The front cam stop 29 is shaped to be engaged by the front end of the dog 25 when carried forward by the movement of the stop plate consequent on energization of the solenoid, and is effective to hold the front end of the dog in a raised position at the end of its forward movement.

The disc 32 secured to shaft 13, with its face in a plane parallel to the face of stop plate 23, will now be described.

The disc 32 is provided with a required number of holes 33, in the form illustrated ten in number, although of course twelve or other number might be used if preferable. The holes are concentrically arranged and equidistant from one another and one is engaged by the front end of the dog 25 on each forward movement of the latter and immediately the back end of the dog is moved away from the rear stop 28. It will be noted, as shown in Figures 5 and 6, the front extremity of the dog is shaped to snugly fit the holes, and as shown in Figure 5, is formed so that when fully entered in the hole, a steeply inclined face 33 back of the top surface 34 is contacted by the back of the wall of the hole, and since at the end of the forward movement of the dog 25 its front end is positively held against downward movement by front cam stop 29, overrunning of disc 32 is prevented. As soon as the stop plate 23 commences its return movement after de-energization of the solenoid due to action of spring 30, the front end of the dog 25 will be clear of the front cam stop 29 so that the back edge of the hole engages sloped portion 33, pushing the forward end of the dog down, and strikes the sloping top face 34 of the dog which is thereby further pushed downward, the tip of the front end thereafter sliding along the face of disc 32.

It will be evident that any tendency to turn disc 32 back is very slight but to ensure against such movement the disc is provided with peripheral recesses 35 of shallow extent which are engaged by a small roller 36 mounted on a spring strip 37 secured to the center housing 12. It is to be noted that the resiliently mounted roller 36 is not relied on to move disc 32 but merely to overcome the slight drag due to the sliding of the forward tip of the dog 25 over the face of the disc 32 during the return movement of the stop plate 23 under the action of the return spring 30.

Since the angular displacement of the armature is limited by the length of the ball races to about 45°, while with ten holes in the disc 32, the angle of rotation of the disc at each engagement by the dog 25 will be 36°, the difference of about 9° of rotation is usefully absorbed by the raising of the back end of the dog by the back cam stop 28. The engaging faces of the back stop 28 and dog 25 are contoured so that the dog 25 is moved to a position such that it is out of contact with the face of disc 32 some 2° to 3° of rotation before termination of the return movement of the stop plate 23 and is positively held in that position. The back stop is positioned so that the return stroke of the dog is such that the forward end of the dog will engage in a hole in disc 23 as soon as the back end of the dog is released from the back stop.

Clearance is provided between the faces of carrier plate 23 and disc 32 sufficient to ensure that the axial movement of the carrier plate, which is very small, in no way affects the driving operation of the disc 32 as just described.

The mounting ring 17 is notched at 39 (Figures 1 and 2) for the passage of leads, not shown, from the solenoid unit.

In the constructional embodiment of the invention illustrated in the drawings a second unit, comprising solenoid operated driving means identical with that described, is mounted on the opposite side of the driven disc 32 with its dog also operating to engage the holes in the disc whenever the solenoid is energized, it being understood that pulses are delivered to one or the other solenoid, the pulses delivered to the second solenoid will effect step by step rotation of disc 32 in the opposite direction to that caused by the first solenoid operated driving means.

The units comprising the instrument may be suitably held together, in the preferred form being inserted in an outer housing 40 indicated at Figure 1, provided with bearings for the shaft and with a pin and slot locating arrangement 38 for the unit as a closed end of the housing. The unit 10 at the closed end of the housing 40 may be located in a fixed position relative to the center inner housing 12 by the usual pin and slot arrangement between the meeting edges of the mounting ring 17 and of the center inner housing 12. It will be noted (Figure 4) that the mounting ring 17 is reduced in diameter at 41 to enable the driving units to be pushed into engagement with the inner center housing 12. The opposite unit 11, which is enclosed by a removable end cap, not shown, of the outer housing, is preferably adjustable angularly with respect to the inner center housing after assembly to ensure that perfect operation of the instrument may be obtained by providing the edge of the inner center housing with fine serrations 42 engaged by a fine set screw 43 (Figure 1) working in a threaded hole through the mounting flange 16.

The instrument above described will operate very satisfactorily as a "stepper motor" for which use it was primarily designed, but it will be obvious that it could be used for any purpose requiring an accurate intermittent motion to actuate equipment in response to signals or pulses of the type utilized in servo-mechanism technique.

The direction of rotation of the solenoid armature is dependent on the left hand or right hand inclination of the cam grooves in the armature plate, the solenoid unit being obtainable in both right hand and left hand drive but it is to be understood that the invention is not limited to the use of the specific construction of solenoid and armature disclosed.

*Operation*

When at rest the dog or dogs 25 are held against the back stop or stops 28 out of contact with the disc 23 and with the forward ends in position to engage in a hole 33 in the disc immediately the dog is released from the back stop by the rotary movement of the stop plate 23 caused by energization of the solenoid by a pulse. The dog will thereby rotate the disc through 36°, in the instrument shown by way of example, and positively stop the disc at the end of such movement, the disc being accurately retained in position by the spring pressed roller 32.

It is emphasized that the full rotational power of the solenoid is applied to turning the disc 32 and the shaft 13 to which the latter is secured, engagement and disengagement of the dog 25 with the disc being effected by the movable mounting of the dog on the stop plate 23 and the resilient effort of spring 31.

While in order to comply with the statute, the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

What is claimed is:

1. In a pulse operated electrical instrument, having a driving unit provided with a solenoid coil, an armature angularly moved in one direction each time said coil is energized by an electrical pulse, and means returning the armature to initial position after each pulse; motion converting mechanism comprising: a disc moved in one direction by said armature and in the reverse direction by the means returning the armature to initial position; a driven disc mounted in a plane parallel to the first mentioned disc; means mounted on and movable relatively to the first mentioned disc; a part stationary with respect to the first mentioned disc; rear stop cam means and front stop cam means mounted on said stationary part and effective to enable the means mounted on said first mentioned disc to move into engagement with the driven disc on the commencement of the movement of said first mentioned disc and to hold said means out of engagement with said driven disc toward the termination of the reverse movement of said first mentioned disc; a shaft rotated by said driven disc; and resilient means urging said means mounted on said first mentioned disc toward the driven disc when said means is free from engagement with the rear stop cam means.

2. In a pulse operated instrument as set forth in claim 1 having a second driving unit provided with a solenoid coil, an armature angularly moved in one direction each time said coil is energized by an electrical pulse, and means returning the armature to initial position after each pulse; motion converting mechanism comprising: a second disc moved in one direction by the armature of the second driving unit and in the reverse direction by the means returning the latter armature to initial position; means mounted on and movable relatively to said second disc; a part stationary with respect to the second disc; rear stop cam means and front stop cam means mounted on said stationary part and effective to enable the means mounted on the second disc to move into engagement with the driven disc on the commencement of the movement of said first mentioned disc and to hold said means out of engagement with said driven disc toward the termination of the reverse movement of said second disc; said shaft being rotated in one direction by the engagement of the means mounted on the disc of one driving unit with the driven disc and in the opposite direction by the engagement of the means mounted on the second disc with the driven disc.

3. In a pulse operated electrical instrument having a solenoid coil, an armature member angularly moved in one direction each time said coil is energized by an electrical pulse, means returning the armature member to initial position after each pulse, and a case by which the solenoid coil and armature are positioned with respect to one another; motion converting mechanism comprising: a sleeve secured to, and angularly moved by, the armature; a centrally apertured disc rigidly secured on said sleeve; means mounted on and movable relatively to said disc; stationary cam means supported by the case and effective to ensure that said means are maintained in predetermined position before and at the completion of each movement of said disc; a shaft rotatably mounted in said sleeve and projecting through said disc; a disc secured on said shaft with a face adjacent and parallel to said first mentioned disc and provided with a number of openings therein concentrically arranged about the axis of the shaft and equally spaced from one another, one of said openings being engaged by, and the second mentioned disc and shaft rotated by, the angular displacement of said means by the movement of the first mentioned disc at each pulse; and resilient means effective to project said motion transmitting means outwardly from the plane of the face of said first mentioned disc toward the second mentioned disc whenever said motion transmitting means are out of engagement with said cam means.

4. In a pulse operated electrical instrument having a solenoid coil, an armature member angularly moved in one direction each time said coil is energized by an electrical pulse; means returning the armature to initial position after each pulse, and a case by which the solenoid coil and armature are positioned with respect to one another; motion converting mechanism comprising: a sleeve secured to and angularly moved by the armature; a centrally apertured disc rigidly secured on said sleeve; a dog pivotally mounted in a slot in said disc; stationary cam means supported by the case and effective to insure that said dog is maintained in predetermined position before and at the completion of each movement of said disc; a shaft rotatably mounted in the sleeve and projecting through said disc; a disc secured on said shaft with a face adjacent and parallel to said first mentioned disc and provided with a number of openings therein concentrically arranged about the axis of the shaft and equally spaced from one another, one of said openings being engaged by, and the second mentioned disc and shaft rotated by, the angular displacement of said dog by the movement of the first mentioned disc at each pulse; and resilient means effective to project said dog outwardly from the plane of the face of said first mentioned disc toward the second mentioned disc whenever said dog is out of engagement with cam means.

5. A pulse operated electrical instrument as set forth in claim 4 and in which said cam means comprise a rear cam stop contoured to hold the dog substantially in a horizontal position out of contact with the disc secured on the shaft whenever the dog is urged against said cam by the action of the armature returning means.

6. A pulse operated electrical instrument as set forth in claim 5 and in which said cam means comprise a front cam stop effective to fully and positively engage the forward end of the dog, at the end of the forward movement thereof, with the aperture in which it is engaged.

7. In a pulse operated electrical instrument having a solenoid coil, an armature angularly moved in one direction each time said coil is energized by an electrical pulse, and means returning the armature to intial position after each pulse; motion connecting mechanism comprising: a disc oscillated in one direction by the armature and in the reverse direction by the means returning the armature to initial position; a driven disc mounted in a plane parallel to the first mentioned disc; a dog pivotally mounted on the first mentioned disc; a part stationary with respect to the first mentioned disc; a rear stop and front stop cam means mounted on said stationary part and effective to move one end of the pivotally mounted dog into engagement with the driven disc on the commencement of the movement of said first mentioned disc and to hold said dog out of engagement with said driven means on the termination of the reverse movement of said first mentioned disc; a shaft rotated by said driven disc; and resilient means urging one end of said dog toward the driven disc when the other end of the dog is free from engagement with the rear stop cam means.

8. A pulse operated electrical instrument as set forth in claim 7 and in which said driven disc is provided with a concentric series of equally spaced holes one of which is engaged by said dog throughout its movement in forward direction.

9. A pulse operated electrical instrument as set forth in claim 8 in which the front end of said dog is formed to provide a portion adapted to be engaged by the rear wall of the hole in the driven disc at the termination of the forward movement of the dog to prevent overrunning of the dog by the driven disc, and with an upwardly sloped face engaged by the back wall of said hole when the dog is released from said front cam stop on the commencement of the return movement of the dog to free the dog from the hole.

References Cited in the file of this patent

UNITED STATES PATENTS

| | | |
|---|---|---|
| 2,449,178 | Sansbury | Sept. 14, 1948 |
| 2,496,880 | Leland | Feb. 7, 1950 |
| 2,706,259 | White | Apr. 12, 1955 |